United States Patent
Dastidar et al.

(10) Patent No.: US 7,412,695 B1
(45) Date of Patent: Aug. 12, 2008

(54) TRANSIENT STATE NODES AND A METHOD FOR THEIR IDENTIFICATION

(75) Inventors: Tathagato Rai Dastidar, Bangalore (IN); Amir Yashfe, Tel-Mond (IL); Partha Ray, Bangalore (IN)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/205,420

(22) Filed: Aug. 17, 2005

Related U.S. Application Data

(63) Continuation-in-part of application No. 11/199,535, filed on Aug. 8, 2005.

(51) Int. Cl.
G06F 9/44 (2006.01)
G06F 17/50 (2006.01)

(52) U.S. Cl. .............. 717/135; 717/132; 717/133; 703/14; 703/15; 703/16

(58) Field of Classification Search .............. 717/138; 703/14
See application file for complete search history.

(56) References Cited

U.S. PATENT DOCUMENTS

| | | | | |
|---|---|---|---|---|
| 5,640,328 | A * | 6/1997 | Lam .......................... | 716/8 |
| 6,138,266 | A * | 10/2000 | Ganesan et al. ............ | 716/5 |
| 6,249,898 | B1 * | 6/2001 | Koh et al. ................... | 716/4 |
| 6,499,129 | B1 * | 12/2002 | Srinivasan et al. ......... | 716/4 |
| 7,246,334 | B1 * | 7/2007 | Dastidar et al. ............ | 716/4 |
| 2004/0044510 | A1 * | 3/2004 | Zolotov et al. ............. | 703/14 |

OTHER PUBLICATIONS

Ng et. al., 'Generation of Layouts from MOS Circuit Schematics: A Graph Theoretic Approach', 22$^{nd}$ Design Automation Conference, pp. 39-45, 1985, IEEE.*
Shakhievich et. al., 'Adaptive Scheduling Algorithm Based on Mixed Graph Model', IEE Proc.—Control Theory Appl., vol. 143, No. 1, Jan. 1996.*
Jones et. al., 'Hierachical VLSI Design Systems based on Attribute Grammars', pp. 58-69, 1986, ACM.*
Chandy et. al., 'Distributed Computation on Graphs: Shortest Path Algorithms', pp. 833-837, 1982, ACM.*
Beerel et. al., 'Testability of Asynchronous Timed Control Circuits with Delay Assumptions',..28$^{th}$ ACM/IEEE Design Automation Conference, pp. 446-451, 1991, ACM.*
Dan Adler, 'Switch-Level Simulation Using Dynamic Graph Algorithms', Mar. 1991, IEEE Transactions on Computer-Aided Design, vol. 10. No. 3.*

* cited by examiner

Primary Examiner—Eric B. Kiss
Assistant Examiner—Ben C Wang
(74) Attorney, Agent, or Firm—Stallman & Pollock LLP

(57) ABSTRACT

Sequential digital integrated circuits have stable state nodes that are capable of retaining their state (logic value) even in the absence of any input directly driving these points. However, in addition to stable state nodes, some custom-designed digital circuits have so-called transient state nodes. A transient state node is defined as node that can directly affect the value of a stable state node and is combinatorially driven by inputs of the circuit, but the transition delay from at least one input to the node is greater than a predefined threshold value. Identifying such transient state nodes, along with the stable state nodes, is critical for the efficient simulation of custom digital circuits by a hierarchical device level digital simulator. A method is provided herein for identifying transient state nodes in a digital circuit, given the circuit's netlist and the identity of the stable state nodes in the circuit.

2 Claims, 5 Drawing Sheets

TRANSIENT STATE NODES AND A METHOD FOR THEIR IDENTIFICATION

RELATED APPLICATION

The present application is a Continuation-In-Part of co-pending and commonly assigned U.S. patent application Ser. No. 11/199,535, filed on Aug. 8, 2005, by Tathagato Rai Dastidar et al., titled "Use of State Nodes for Efficient Simulation of Large Digital Circuits at the Transistor Level." application Ser. No. 11/199,535 is hereby incorporated by reference in its entirety.

TECHNICAL FIELD

The present invention relates to integrated circuit design methodologies and, in particular, to a method for identifying transient state nodes in the native module hierarchy of a digital integrated circuit.

BACKGROUND OF THE INVENTION

Software programs for use in simulating integrated circuit design and predicting the operational behavior of the circuit are well known to those skilled in the art.

FIG. 1 shows a well-known general architecture of a data processing system 100 that can be utilized to execute a program implementation of a digital integrated circuit simulator. The data processing system 100 includes a central processing unit (CPU) 102 and a system memory 104 that is connected to the CPU 102. The system memory 104 typically stores the operating system for the CPU 102 as well as data and various sets of program instructions for applications programs to be executed by the system 100. For example, the system memory 104 could store a software program, i.e. a sequence of machine readable program instructions, needed to implement a method for using state nodes for the efficient simulation of digital integrated circuits at the transistor level in accordance with the concepts of the present invention. Typically, the computer system 100 also includes a display 106 that is connected to the CPU 102 to allow images to be visually displayed to a user, a user input system 108, e.g., a keyboard or mouse, that allows the user to interact with the system 100, and a memory access system 110 that enables transfer of data both within the system 100 and between the system 100 and systems external to the system 100, e.g. a computer network to which the system 100 is connected. All of these components and the ways in which they interact are well known to persons skilled in the art.

Conventional device level digital integrated circuit simulators, such as the well-know public domain tool IRSIM, supported by the University of California—Berkeley, work on "flat" circuits, that is, circuits that have no module hierarchy. Thus, a hierarchical circuit must be flattened to transistor level before it will work on these conventional simulators. This approach has a major drawback. Most digital circuits, whether custom designed (e.g., memories) or standard cell based (e.g., ASICs), make extensive re-use of the same building blocks or lower level modules. For example, the major portion of a static random access memory (SRAM) circuit is made up of multiple repetitions of the same six-transistor core cell. A flattened netlist of the SRAM design does not reflect this fact. Simulations of identical circuit modules are repeated for each occurrence of the module in the circuit, resulting in a relatively time-consuming operation.

SUMMARY OF THE INVENTION

The present invention provides a method of detecting transient state points in a digital integrated circuit. In accordance with an embodiment of the method, a schematic of the circuit containing stable state points is provided. A graph $G=(V, E_1, E_2)$ is then defined, where V is a set of vertices, $E_1$ is a set of directed edges, and $E_2$ is a set of undirected edges, and wherein both a directed edge and an undirected edge can exist between a pair of vertices in the graph. The graph G is constructed in accordance with the following: (i) for each node in the circuit, create a vertex in the graph; (ii) for every transistor in the circuit, add a directed edge from the vertex representing the gate node of the transistor to the vertex representing the source node of the transistor, add a directed edge from the vertex representing the gate node of the transistor to the vertex representing the drain node of the transistor, and add an undirected edge between the vertices representing the source node and the drain node of the transistor, a directed edge from a vertex A to a vertex B being denoted vertex A being the "parent" of vertex B, and two vertices connected by an undirected edge being denoted as "peers"; and (iii) for every submodule in the circuit, add a directed edge from each input of the submodule to all of the outputs of the submodule, the weight of all edges being taken as 1. The all pairs shortest path matrix of the graph G is then created using only the directed edges. For each stable state node in the circuit, a peer list is made of all its peers in the graph G. Each peer is checked to determine if that peer is an input or a stable state node. If the peer is an input or a stable state node, the next peer in the peer list is checked. If the peer is not an input or a stable state node, a parent list of all parents of the peer is made. Each parent is checked. If the parent is an input or a stable state node, the next parent in the parent list is checked. If the parent is not an input or a stable state node, it is determined if a path exists from an input to that parent. If a path does not exist from an input to that parent, then the next parent in the parent list is checked. If a path does exist from an input to the parent, then it is determined if the path consists of directed edges only. If the path does not consist of directed edges only, then the next parent in the parent list is checked. If the path does consists of directed edges only, then it is determined if the path is greater than or equal to a threshold length. If the path is not equal to or greater than the threshold length, then the next parent in the parent list is checked. If the path is greater than or equal to the threshold length, then the parent is identified as a transient state node.

DESCRIPTION OF THE INVENTION

The above-referenced related application Ser. No. 11/199,535 discloses a simulation method that takes advantage of the fact that, when an instance of a circuit module has been simulated under a given set of input conditions, and the resulting output values and delays have been evaluated, another instance of the same module need not be re-simulated when it has the same input combination as the prior module instance; the stored results computed for the earlier module instance can be re-used for the current module instance.

Figure 2:
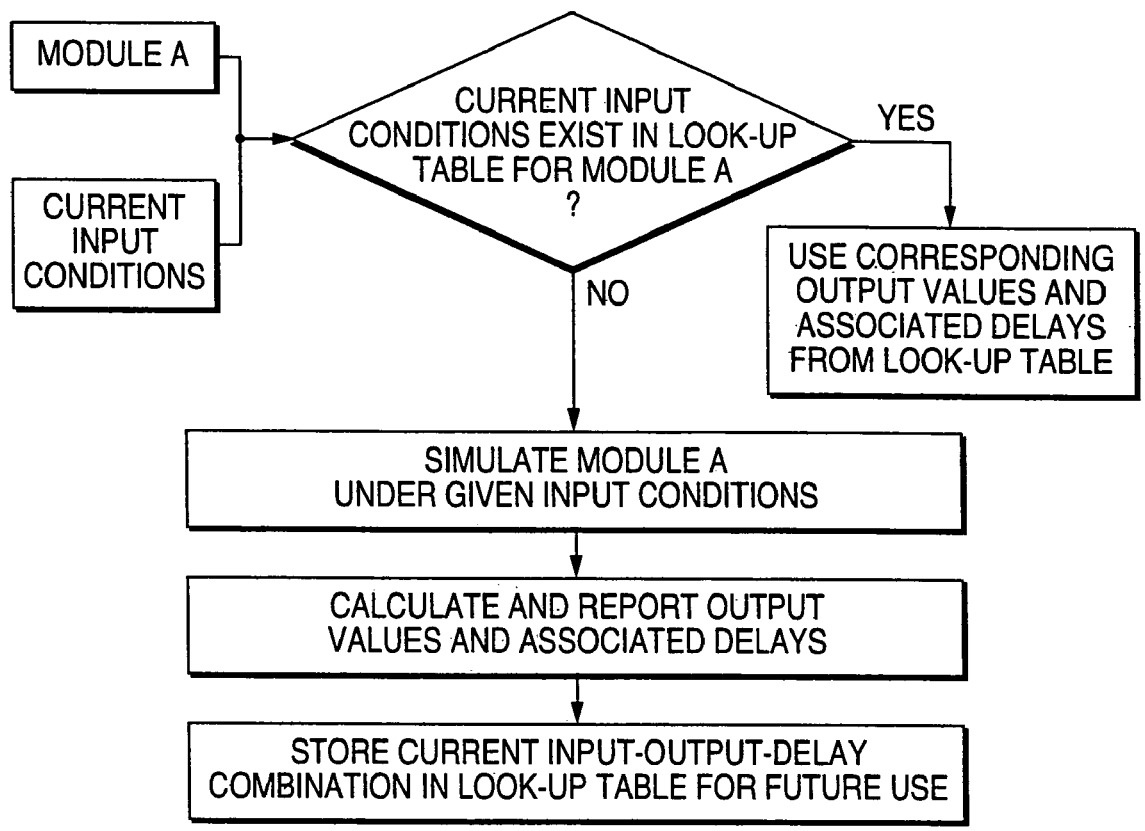
FIG. 2 is a flow chart illustrating a method of simulating combinatorial logic modules.

FIG. 2 shows a flow chart of a method of simulating combinatorial logic modules in a digital circuit. As shown in FIG. 2, for a module A in the hierarchy of an integrated circuit design, a look-up table is maintained that stores the input-output combinations encountered for any instance of module A. When an instance of module A needs re-simulation (i.e., one or more of its inputs change value), the look-up table is checked to determine if the current input values have been encountered in an earlier simulation of module A. If they have, then the output and delay values stored in the look-up table are used and a complete re-simulation of this instance of module A is avoided. This drastically reduces the simulation time. When the current input values for that instance of module A are not present in the look-up table, then a simulation is performed and the output and delay results for that instance of module A are stored in the look-up table and can be used in future re-simulations of any other instance of module A.

The method described above works for the simulation of purely combinatorial modules, since the output values and delays of a combinatorial module are governed solely by its inputs. However, for sequential modules, the output conditions of the module depend not only upon the inputs, but also upon the present state of the module. Thus, for sequential modules, not only the input-output combinations, but also the states must be stored. For each instance of a module in the sequential circuit, its present state must be stored in the look-up table. During a simulation, the output combinations of that instance of the module are determined based upon the input values and the present state. After the simulation, the state of the module instance is updated to the next state. As is well known, this relation can be expressed as:

$$(O, NS) = f(I, PS) \quad (1)$$

where, O is the output vector, NS is the next state, I is the input vector, PS is the present state, and $f$ is a Boolean function.

The problem is how to define what is meant by a "state" of a sequential module. One obvious (recursive) definition is as follows. The state of a module is defined by: (1) the state (logic value) of all of the internal nodes in the circuit; and (2) the state of all sub-modules of this module. However, this "obvious" definition has two major problems. First, storing the value of all of the internal nodes in a module for all instances of that module has a huge memory overhead and a look-up table search time penalty. Second, some (or all) of the sub-modules of a module may be combinatorial in nature, making it is unnecessary to store their states.

The simulation method disclosed in the above-referenced related application Ser. No. 11/199,535 makes use of "state nodes" to circumvent the above-described problem. Intuitively, a state node is a node that can retain its logic value even in the absence of an input directly driving this node. As discussed in the above-referenced application, a circuit module is termed sequential if either of the following conditions holds true: (1) the module has state nodes or (2) the module has one or more sequential sub-modules.

The "state" of a sequential module is defined as follows. The state consists of: (1) the state (logic value) of all state nodes of the module and (2) the state of all sequential sub-modules of the module. Since the number of state nodes in a circuit is much less than the number of internal nodes, this definition of a module state is much more efficient in terms of both space as well as lookup time than the earlier definition.

Figure 1:
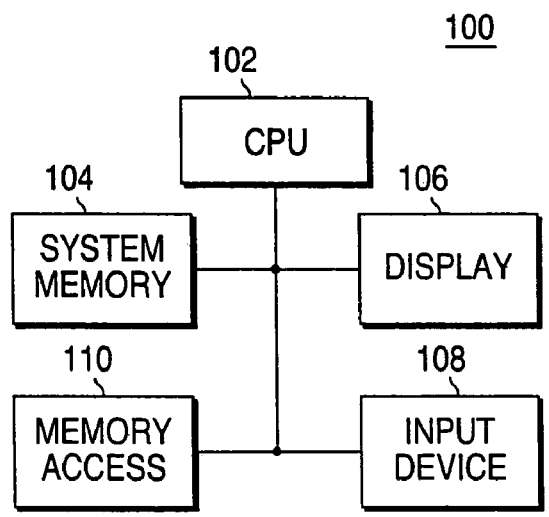
FIG. 1 is a block diagram illustrating a conventional data processing system.
Figure 3:
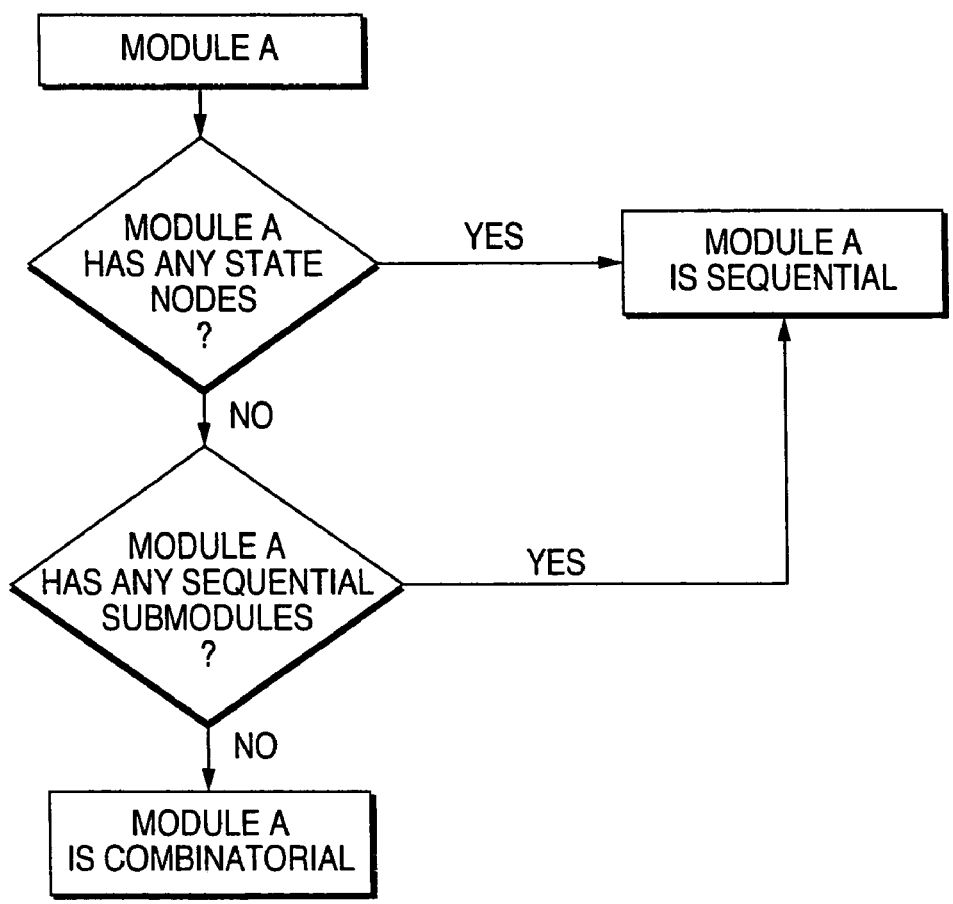
FIG. 3 is a flow chart illustrating a method of distinguishing between combinatorial logic circuit modules and sequential circuit modules.

The FIG. 3 flow chart summarizes the process of distinguishing between combinatorial modules and sequential modules. As shown in the FIG. 3 flow, if a module A has any state nodes, then it is defined as a sequential module. If the module A has no state nodes, but includes sequential submodules, then it is defined as a sequential module. If module A has neither state nodes nor sequential submodules, then it is defined as a combinatorial module and may be simulated as such in accordance with the FIG. 2 flow described above.

Figure 4:
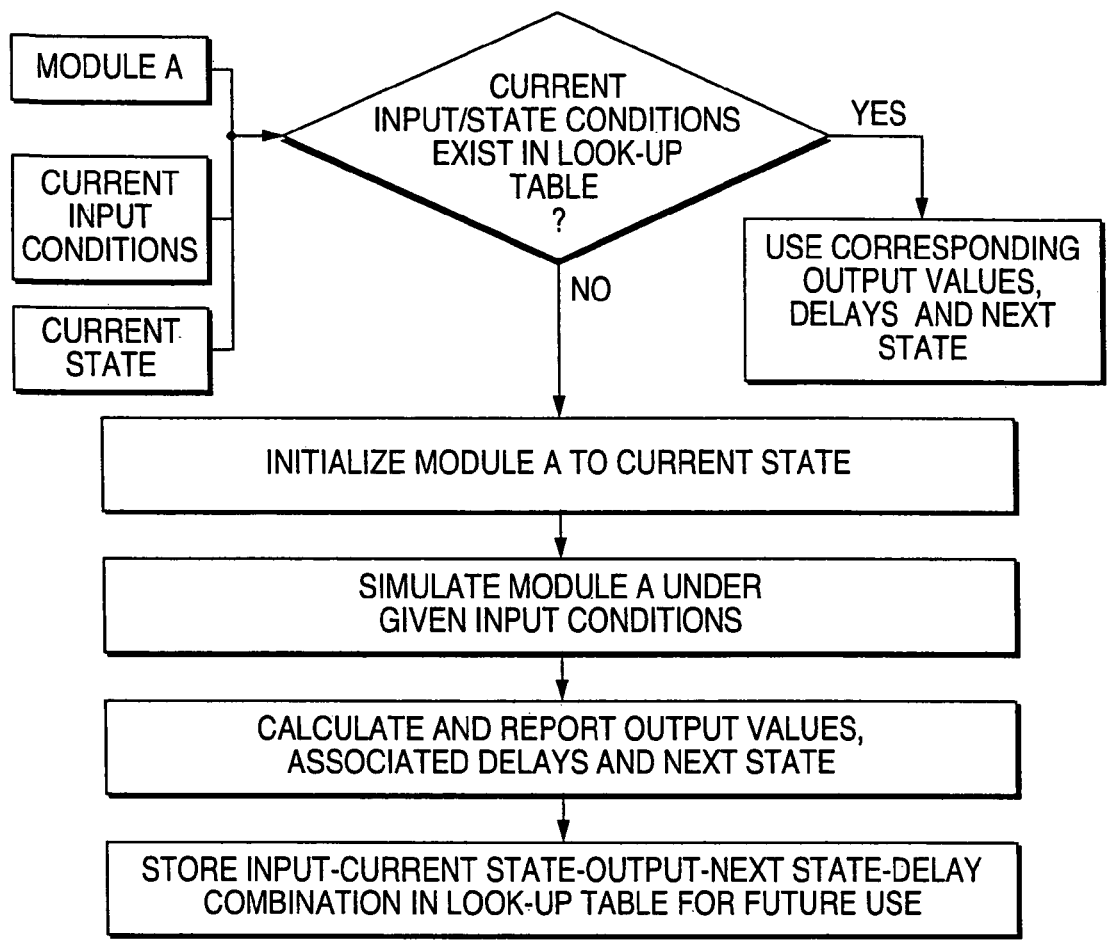
FIG. 4 is a flow chart illustrating a method of simulating sequential circuit modules.

With reference to the FIG. 4 flow chart, and as discussed in the above-referenced related application, simulation of an instance of a sequential module A proceeds as follows. If the combination of the current inputs to the sequential module A and its current state exists in the look-up table, then the stored output combinations for this instance of module A are used and the current state is updated to the next state from the look-up table. Otherwise, all state nodes of the module A are initialized to the values stored in the current state. All sequential submodules are initialized to their states as stored in the current state. The input stimulus is provided and this instance of module A is simulated. When simulation of this instance of module A is completed (i.e., either there are no pending events or the simulation time is up), the output values are returned to storage in the look-up table. The next state of the module is then created and the values of all state nodes and the states of all sequential submodules are stored in the next state. Not only the last obtained value of a state node, but also the values it receives during the simulation are stored. If a state node changes value more than once (e.g., in case of a pulse), then all value changes are stored.

Sequential circuits have stable state points that are capable of retaining their state (logic value) even in the absence of any input directly driving these points. A method for automatically identifying stable state points in transistor level digital circuits is described in detail in co-pending and commonly assigned U.S. patent application Ser. No. 11/167,523, filed on Jun. 27, 2005, and titled "Method of Identifying State Nodes at the Transistor Level in a Sequential Digital Circuit." In the method disclosed in application Ser. No. 11/167,523, a number of minimum combinatorial feedback loops that are present in the circuit are identified. Each minimum combinatorial feedback loop has at least one driver node. A driver node from each minimum combinatorial feedback loop is assigned to be a state node in accordance with predefined criteria. Application Ser. No. 11/167,523 is hereby incorporated by reference in its entirety to provide background information regarding the present invention.

In addition to stable state points, some custom designed digital circuits include what will be referred to herein as "transient state points." In accordance with the concepts of the present invention, a "transient state point" is defined as a node that can directly affect the value of a state point and is combinatorially driven by inputs of the circuit, but the transition delay from at least one input to the node is greater than a predefined threshold value.

Transient state points need to be identified as state points for hierarchical simulator to function properly. This is the case because, after every simulation of a given module, the simulator "forgets" the values at all internal nodes in the circuit, except the state points (in case of sequential circuits). The next time the module is simulated, the state points are initialized to their logic values in the previous state. All other internal nodes are initialized to X (unknown) logic state. If the transient state points are not identified as state points, then they too are initialized to X. Due to the propagation delay from the inputs, these points do not reach a valid logic value immediately. Since they can directly affect the value of stable state points, a stable state point can lose its value (and become X) if the transient state points remain at X for a considerable period of time. Hence, these points need to be identified as state points so that they will be initialized to a non-X logic value during the next simulation and prevent the stable state points from losing their values.

Figure 5:
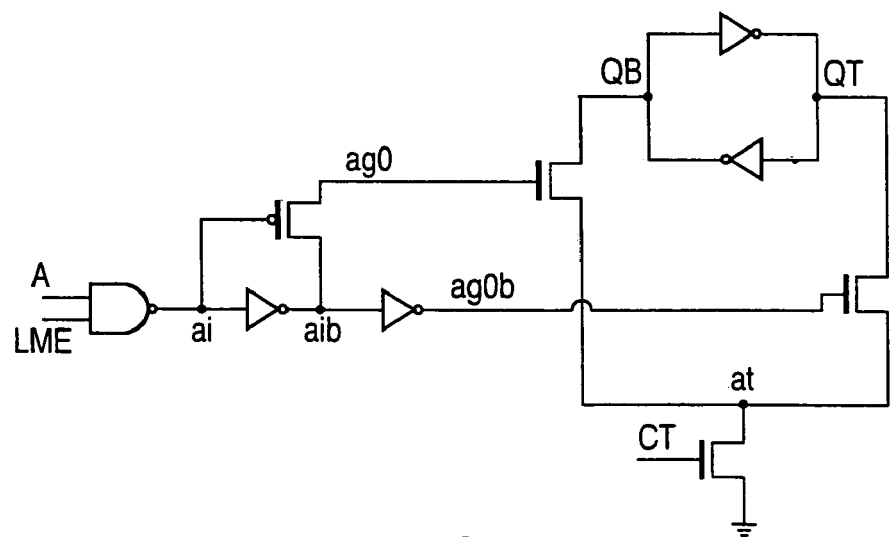
FIG. 5 is a schematic drawing illustrating an embodiment of a conventional circuit containing transient state points.

An example of a circuit containing transient state points is shown in FIG. 5. In the FIG. 5 circuit, the stable state points are QB and QT, and can be detected by the state point detection algorithm described in above-referenced application Ser. No. 11/167,523. The nodes ag0 and ag0b are transient state points, since they affect the stable state points and the propagation delay from the inputs to these nodes is higher than a predefined threshold. The FIG. 5 circuit is a well-known module of a CMOS single-port SRAM circuit.

An algorithm for detecting transient state points in accordance with the concepts of the present invention will now be described with reference to the FIG. 6 flow chart.

A graph $G=(V, E_1, E_2)$ is defined where V is a set of vertices, $E_1$ is a set of directed edges, and $E_2$ is a set of undirected edges. There can be both a directed edge and an undirected edge between a pair of vertices in the graph. Given the schematic of a circuit containing stable state points, such a graph is constructed by applying the following rules: (1) for each node in the circuit (including input, output, inout and internal nodes of the circuit), a vertex is created in the graph, (2) for every transistor in the circuit, a directed edge is added from the vertex representing the gate node to the vertex representing the source node, a directed edge is added from the vertex representing the gate node to the vertex representing the drain node, and an undirected edge is added between the source and drain nodes, and (3) for every submodule in the circuit, a directed edge is added from each input of the submodule to all of its outputs.

If there is a directed edge from vertex A to vertex B, then vertex A is denoted as the "parent" of vertex B. Two vertices connected by an undirected edge are called "peers." The "weight" of all edges is taken as 1.

Figure 7:
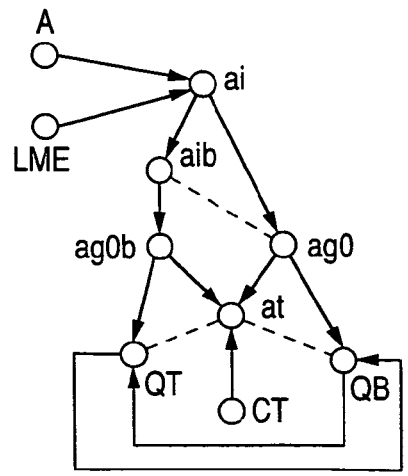
FIG. 7 is a graph representation of the FIG. 5 circuit created in accordance with the FIG. 6 flow.
Figure 6:
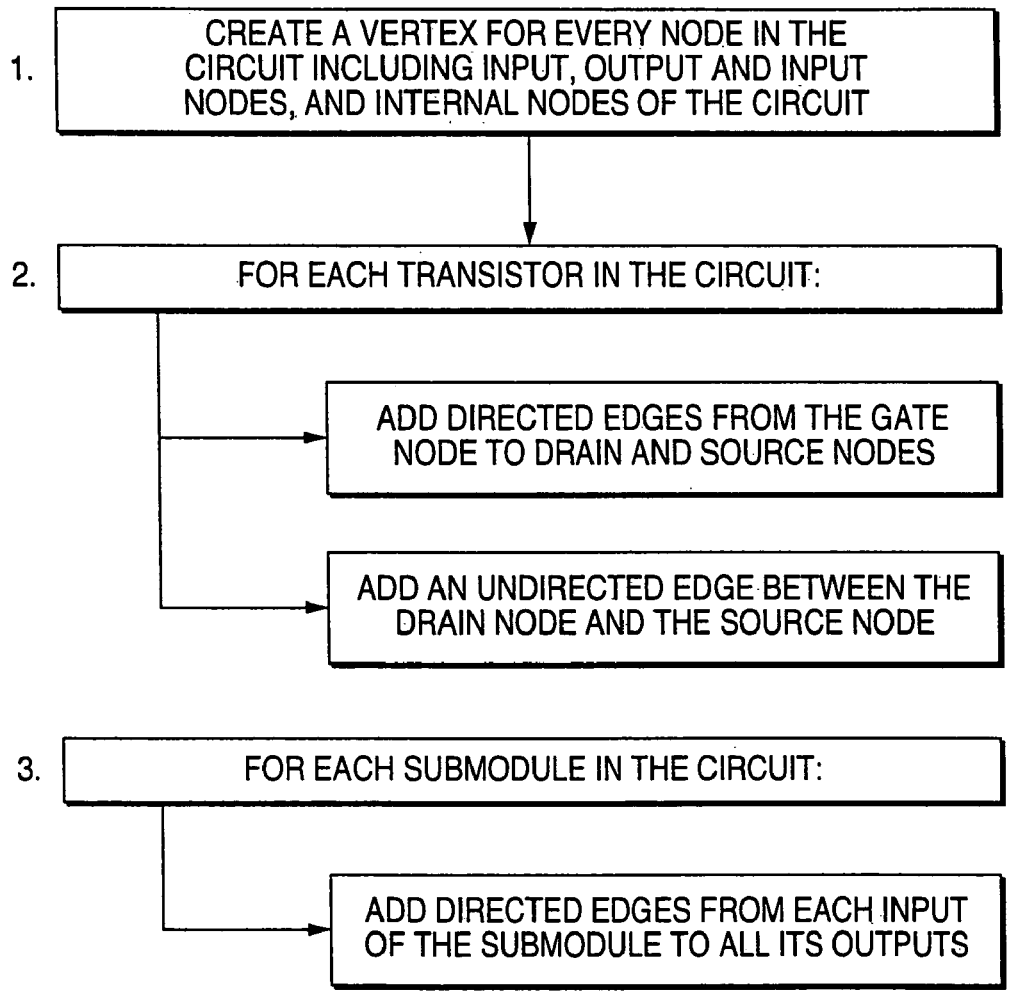
FIG. 6 is a flow chart illustrating a method of constructing a graph from a circuit netlist in accordance with the concepts of the present invention.

The graph created from the schematic of FIG. 5 in accordance with the FIG. 6 flow is shown in FIG. 7. The power supply and ground vertices have been omitted for brevity. The directed edges are shown as arrows and the undirected edges are shown as dotted lines.

Figure 8:
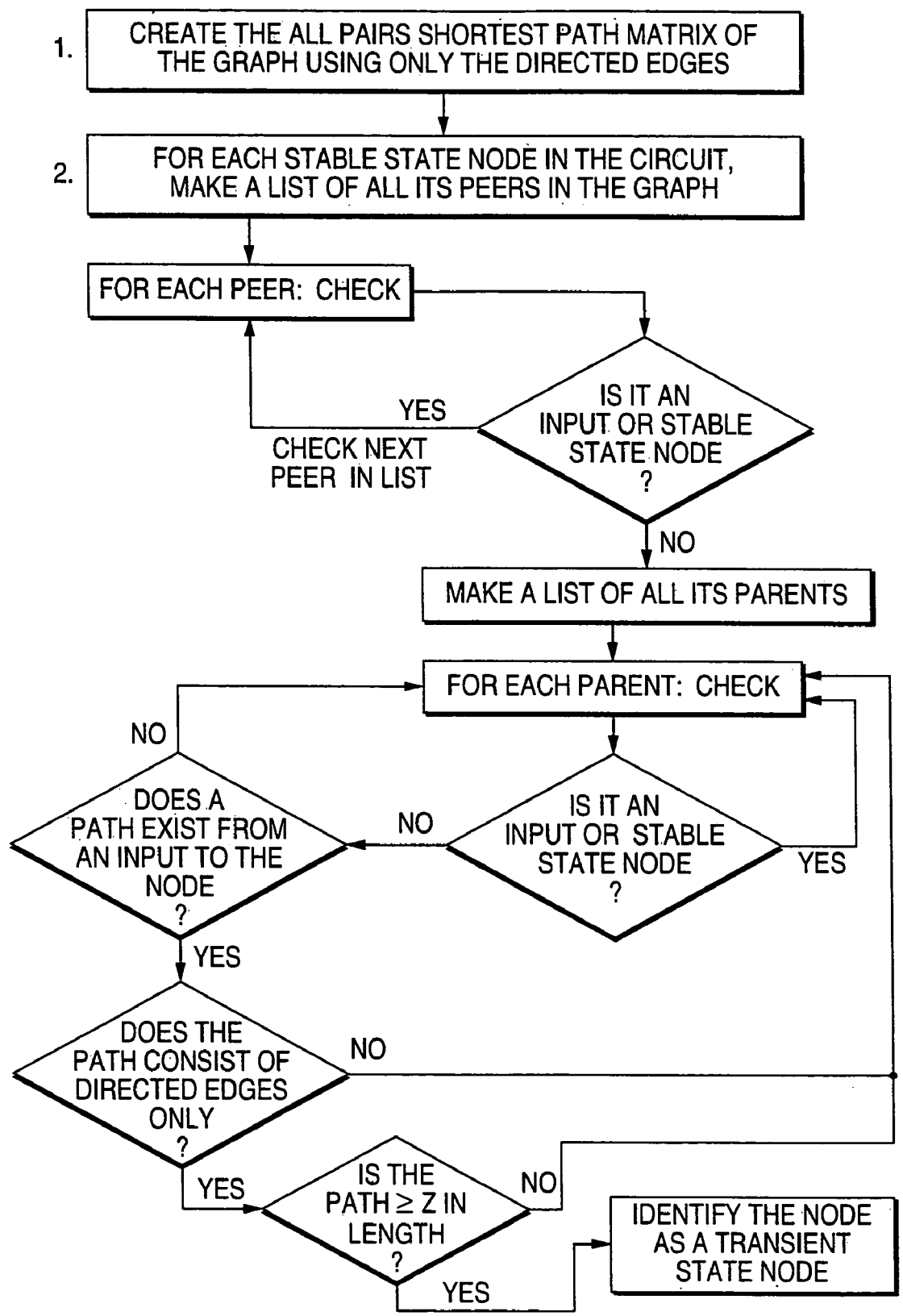
FIG. 8 is a flow chart illustrating a method of identifying transient state nodes from the graph representation of the circuit, in accordance with the concepts of the present invention.

Referring to the FIG. 8 flow chart, once a graph of the type shown in FIG. 7 has been created, the following steps are applied. Using only the directed edges, the all-pairs shortest path matrix of the graph is created, denoting the minimum path length between all pairs of vertices. This can be done using the well-known standard Floyd Warshall's algorithm. If no path exists between a pair of nodes, then the path length is taken to be infinity. For each stable state point, a list of all it peers is made. For each such peer, if it is not an input or a stable state point, a list of all its parents is made. For each such parent, if it is not an input or a stable state point, if a path consisting of directed edges only exists from any input to the vertex, and the length of that path is greater than or equal 2, then it taken as a transient state point.

In the FIG. 7 graph, QB and QT are stable state points, and their peer is the vertex at. Vertex at has three parents: node ag0, node ag0b and CT. CT is an input, so it cannot be a state point. Paths exist from A and LME (both are inputs) to both node ag0 ard node ag0b, and each path is greater than or equal to two edges in length. Hence, node ag0 and node ag0b are detected to be transient state points.

It should be understood that the particular embodiments of the invention described above have been provided by way of example and that other modifications may occur to those skilled in the art without departing from the scope and spirit of the invention as expressed in the appended claims and their equivalents.

What is claimed is:

1. A method of detecting transient state points in a digital integrated circuit, the method comprising:
   (a) providing a schematic of the digital integrated circuit containing stable state points;
   (b) defining a graph G=(V, E1, E2), wherein V is a set of vertices, E1 is a set of directed edges, and E2 is a set of undirected edges, and wherein both a directed edge and an undirected edge can exist between a pair of vertices in the graph, the graph being constructed in accordance with the following:
      (i) for each node in the digital integrated circuit, creating a vertex in the graph;
      (ii) for every transistor in the digital integrated circuit, adding a directed edge from the vertex representing the gate node of said transistor to the vertex representing the source node of said transistor, adding a directed edge from the vertex representing the gate node of said transistor to the vertex representing the drain node of said transistor, and adding an undirected edge between the vertices representing the source node and the drain node of said transistor, a directed edge from a vertex A to a vertex B being denoted vertex A being the "parent" of vertex B, and two vertices connected by an undirected edge being denoted as "peers"; and
      (iii) for every submodule in the digital integrated circuit, adding a directed edge from each input of the submodule to all of the outputs of said submodule, the weight of all edges being taken as 1;
   (c) creating the all pairs shortest path matrix of the graph G using only the directed edges;
   (d) for each stable state node in the digital integrated circuit, making a peer list of all its peers in the graph G;
   (e) for each peer, checking to determine if said peer is an input or a stable state node, and, in the event that said peer is an input or a stable state node, then checking the next peer in said peer list, and, in the event that said peer is not an input or a stable state node, then making a parent list of all parents of said peer;
   (f) for each said parent,
      (i) checking if said parent is an input or a stable state node, and, in the event that said parent is an input or a stable state node, then checking the next parent in said parent list, and, in the event that said parent is not an input or a stable state node, then determining if a path exists from an input to said parent;
      (ii) in the event that a path does not exist from an input to said parent, then checking the next parent in said parent list, and, in the event that a path does exist from an input to said parent, then determining if said path consists of directed edges only;

(iii) in the event that said path does not consist of directed edges only, then checking the next parent in said parent list, and, in the event that said path does consists of directed edges only, then determining if said path is greater than or equal to a threshold length; and (vi) in the event that said path is not equal to or greater than the threshold length, then checking the next parent in said parent list, and, in the event that said path is greater than or equal to the threshold length, then identifying said parent as a transient state node.

2. A machine-readable medium having stored thereon sequences of instructions for detecting transient state points in a digital integrated circuit, the sequences of instructions including instructions that when executed by a data processing system, cause the data processing system to perform:

(a) providing a representation of a schematic of the digital integrated circuit containing stable state points;

(b) defining a graph G=(V, E1, E2), where V is a set of vertices, E1 is a set of directed edges, and E2 is a set of undirected edges, and wherein both a directed edge and an undirected edge can exist between a pair of vertices in the graph, the graph being constructed in accordance with the following:

(i) for each node in the digital integrated circuit, creating a vertex in the graph;

(ii) for every transistor in the digital integrated circuit, adding a directed edge from the vertex representing the gate node of said transistor to the vertex representing the source node of said transistor, adding a directed edge from the vertex representing the gate node of said transistor to the vertex representing the drain node of said transistor, and adding an undirected edge between the vertices representing the source node and the drain node of said transistor, a directed edge from a vertex A to a vertex B being denoted vertex A being the "parent" of vertex B, and two vertices connected by an undirected edge being denoted as "peers"; and (iii) for every submodule in the circuit, adding a directed edge from each input of the submodule to all of the outputs of said submodule, the weight of all edges being taken as 1;

(c) creating the all pairs shortest path matrix of the graph G using only the directed edges;

(d) for each stable state node in the circuit, making a peer list of all its peers in the graph G;

(e) for each peer, checking to determine if said peer is an input or a stable state node, and, in the event that said peer is an input or a stable state node, then checking the next peer in said peer list, and, in the event that said peer is not an input or a stable state node, then making a parent list of all parents of said peer;

(f) for each said parent, (i) checking if said parent is an input or a stable state node, and, in the event that said parent is an input or a stable state node, then checking the next parent in said parent list, and, in the event that said parent is not an input or a stable state node, determining if a path exists form an input to said parent;

(ii) in the event that a path does not exist from an input to said parent, then checking the next parent in said parent list, and, in the event that a path does exist from an input to said parent, then determining if said path consists of directed edges only;

(iii) in the event that said path does not consist of directed edges only, then checking the next parent in said parent list, and, in the event that said path does consists of directed edges only, then determining if said path is greater than or equal to a threshold length; and (iv) in the event that said path is not equal to or greater than the threshold length, then checking the next parent in said parent list, and, in the event that said path is greater than or equal to the threshold length, then identifying said parent as a transient state node.

* * * * *